(12) United States Patent
Dillard et al.

(10) Patent No.: US 11,952,142 B2
(45) Date of Patent: Apr. 9, 2024

(54) METHODS AND SYSTEMS FOR DEPICTING AVIONICS DATA ANOMALIES

(71) Applicant: HONEYWELL INTERNATIONAL INC., Charlotte, NC (US)

(72) Inventors: Michael Dillard, St. Louis Park, MN (US); Umut Orhan, Kirkland, WA (US); Stephen Whitlow, St. Louis Park, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 326 days.

(21) Appl. No.: 17/315,785

(22) Filed: May 10, 2021

(65) Prior Publication Data

US 2022/0411094 A1    Dec. 29, 2022

(51) Int. Cl.
*B64D 45/00* (2006.01)
*G06T 11/20* (2006.01)
*G06T 13/80* (2011.01)

(52) U.S. Cl.
CPC ............ *B64D 45/00* (2013.01); *G06T 11/206* (2013.01); *G06T 13/80* (2013.01)

(58) Field of Classification Search
CPC ...................................................... B64D 45/00
See application file for complete search history.

(56) References Cited

U.S. PATENT DOCUMENTS

| | | | |
|---|---|---|---|
| 7,457,785 B1 | 11/2008 | Greitzer et al. | |
| 10,814,883 B1* | 10/2020 | Dixit | B60W 50/02 |
| 10,858,123 B2 | 12/2020 | Dillard et al. | |
| 2009/0055228 A1 | 2/2009 | Henry et al. | |
| 2011/0046996 A1* | 2/2011 | Foucher | G06Q 10/063 705/7.11 |
| 2011/0313726 A1 | 12/2011 | Parthasarathy et al. | |
| 2013/0073260 A1 | 3/2013 | Maeda et al. | |
| 2016/0180718 A1 | 6/2016 | Shapiro et al. | |
| 2017/0301247 A1 | 10/2017 | Sherry et al. | |
| 2017/0358153 A1* | 12/2017 | Tucker | G05B 23/0283 |
| 2017/0364818 A1* | 12/2017 | Wu | G06F 11/3006 |
| 2018/0348087 A1 | 12/2018 | Khibnik et al. | |
| 2019/0130669 A1 | 5/2019 | Boggio | |
| 2020/0357200 A1* | 11/2020 | Wang | G07C 5/0808 |

(Continued)

FOREIGN PATENT DOCUMENTS

| | | |
|---|---|---|
| EP | 2620916 A2 | 7/2013 |
| EP | 3065016 B1 | 12/2020 |

OTHER PUBLICATIONS

The Boeing Company, Boeing FCOM Flight Crew Operations Manual 787-8, Document No. D615Z003-TBC, Revision No. 4, Feb. 15, 2010, p. 10.10.26.

(Continued)

*Primary Examiner* — Joseph H Feild
*Assistant Examiner* — Pameshanand Mahase
(74) *Attorney, Agent, or Firm* — Lorenz & Kopf LLP

(57) ABSTRACT

Methods and systems for depicting avionics data anomalies in an aircraft. Time series data is received from the avionics data source, a future time is predicted when a first anomaly threshold will be crossed based on the time series data, and the future time when the first anomaly threshold will be crossed is depicted on a display device associated with the aircraft.

17 Claims, 9 Drawing Sheets

(56) References Cited

U.S. PATENT DOCUMENTS

2021/0072740 A1    3/2021  Huang et al.
2022/0406195 A1*  12/2022  Janakiraman ........ G08G 5/0052

OTHER PUBLICATIONS

Congressional Research Service, "Cockpit Automation, Flight Systems Complexity, and Aircraft Certification: Background and Issues for Congress," Oct. 3, 2019, Congressional Research Service; https://crsreports.congress.gov, R45939.
Gschwandtner, Theresia, et al., "Visual Encodings of Temporal Uncertainty: A Comparative User Study," IEEE Transactions on Visualization and Computer Graphics, vol. 22, No. 1, Jan. 2016.
Whitlow, Stephen D., et al., "Intelligent Modules and Advanced Displays to Support Pilot Airplane System State Awareness," IEEE, 2019.

* cited by examiner

METHODS AND SYSTEMS FOR DEPICTING AVIONICS DATA ANOMALIES

TECHNICAL FIELD

The subject matter described herein relates generally to depicting avionics data source anomalies in aircraft systems.

BACKGROUND

While various forms of automation have been incorporated into vehicles such as aircraft, a vehicle operator often has to manually operate the vehicle in response to abnormal events or various other conditions or scenarios. For example, in response to abnormal events during flights, pilots often must rely upon onboard instruments in conjunction with their personal training and airmanship to fly the aircraft. A pilot's ability to safely aviate, navigate, and communicate can be challenged when one or more instruments malfunction or become unreliable. Accordingly, modern aircraft typically include redundant sensors and data systems. Logical comparisons have been utilized to compare data outputs against one another to identify discrepancies that exceed thresholds, thereby notifying pilots of potential anomalies, which, in turn, allow pilots to determine which sensor or system is unreliable and switch to a reliable data source.

Though redundancy is generally effective, it can be difficult, in some scenarios, to determine which data source is reliable, and within the amount of time available to a pilot to assess the situation without compromising situational awareness and safe operation of flight. For example, when redundant sensors or systems are each outputting faulty data, neither the pilot nor the automation system that consumes the data may be able to determine which data source, if any, can be trusted. Other incidents have occurred where redundant sensors have become frozen or otherwise stuck in a persistent state where their output data matches, and thus, does not provide any indication of the potential anomalous output data and could result in valid data being identified as anomalous by virtue of a discrepancy between the valid data with respect to matching invalid data.

Furthermore, an unexpected anomalous data report can startle or surprise the flight crew, which may result in sub-optimal decision making because of increased stress caused by the sudden situational change.

Accordingly, it is desirable to provide methods and systems to improve the detection and pilot notification of data anomalies that may otherwise go undetected using conventional approaches. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, the present disclosure provides a method for depicting avionics data anomalies in an aircraft. The method includes receiving, via at least one processor, time series data from at least one avionics data source, predicting, via the at least one processor, a future time when a first anomaly threshold will be crossed based on the time series data, and depicting, on a display device associated with the aircraft, the future time when the first anomaly threshold will be crossed.

In one embodiment, the predicting step provides a time uncertainty associated with the future time when the first anomaly threshold will be crossed and wherein the depicting step includes depicting the future time when the first anomaly threshold will be crossed and the time uncertainty. The time uncertainty may be depicted using one or more error bars.

In one embodiment, the depicting step includes depicting a failure flag on a time scale, wherein the position of the failure flag on the time scale is set based on the future time. The time scale may auto-scale as the future time approaches. The depicting step may include animation to move the failure flag relative to the time scale as the future time approaches.

In another embodiment, the method includes determining, via the at least one processor, that the at least one avionics data source is currently anomalous when the first anomaly threshold has been crossed based on the time series data, depicting, on the display device, a failure flag depicting a currently anomalous status flag for the at least one avionics data source, and predicting, via the at least one processor, a second future time when a functioning threshold will be crossed based on the time series data, the second future time representing when the at least one avionics data source will be deemed no longer anomalous and functioning, and depicting, on the display device associated with the aircraft, the second future time when the functioning threshold will be crossed. The failure flag may move along a time graph as the future time approaches and move into a static gutter portion adjacent the time graph when the at least one avionics data source is determined to be currently anomalous.

In embodiments, the method includes determining, via the at least one processor, anomaly metric data based on the time series data, predicting, via the at least one processor, the future time when the first anomaly threshold will be crossed based on the anomaly metric data, and depicting, on the display device associated with the aircraft, the future time when the first anomaly threshold will be crossed. The method may include determining the anomaly metric data, determining anomaly metric data representing data jump, determining anomaly metric data representing frozen data source, determining anomaly metric data representing gradual data drift, and/or determining anomaly metric data representing data variance.

In an embodiment, the method includes initiating predicting the future time when a second anomaly threshold is crossed based on the time series data.

In embodiment, predicting the future time is performed by linear extrapolation, polynomial extrapolation, autoregressive methods or other prediction function.

In embodiments, the at least one avionics data source comprises: distance measuring data source, flight path vector source, aircraft speed data source, aircraft altitude data source, instrument landing system data source, aircraft heading data source, aircraft attitude data source, glideslope data source, flight director data source, and/or vertical speed data source.

In embodiments, the method includes displaying one or more display elements based on the time series data and removing the one or more display elements when the at least one avionics data source is determined to be currently anomalous when the first anomaly threshold has been crossed based on the time series data.

In another aspect, a system for depicting avionics data anomalies in an aircraft is provided. The system includes a display device associated with the aircraft, an avionics data source, and a processor in operable communication with the display device and the avionics data source. The processor is configured to execute program instructions. The program instructions are configured to cause the processor to perform the following steps. Time series data is received from the avionics data source, a future time is predicted when a first anomaly threshold will be crossed based on the time series data, and the future time when the first anomaly threshold will be crossed is depicted via the display device associated with the aircraft.

In embodiments, the program instructions are configured to cause the processor to provide a time uncertainty associated with the future time when the first anomaly threshold will be crossed and to depict the future time when the first anomaly threshold will be crossed and the time uncertainty. The time uncertainty may be depicted using one or more error bars.

In an embodiment, the program instructions are configured to cause the processor to depict a failure flag on a time scale, wherein the position of the failure flag on the time scale is set based on the future time. The program instructions may be configured to cause the processor to include animation to move the failure flag relative to the time scale as the future time approaches.

In one embodiment, the program instructions are configured to cause the processor to determine anomaly metric data based on the time series data, predict the future time when the first anomaly threshold will be crossed based on the anomaly metric data, and depict, via the display device associated with the aircraft, the future time when the first anomaly threshold will be crossed.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
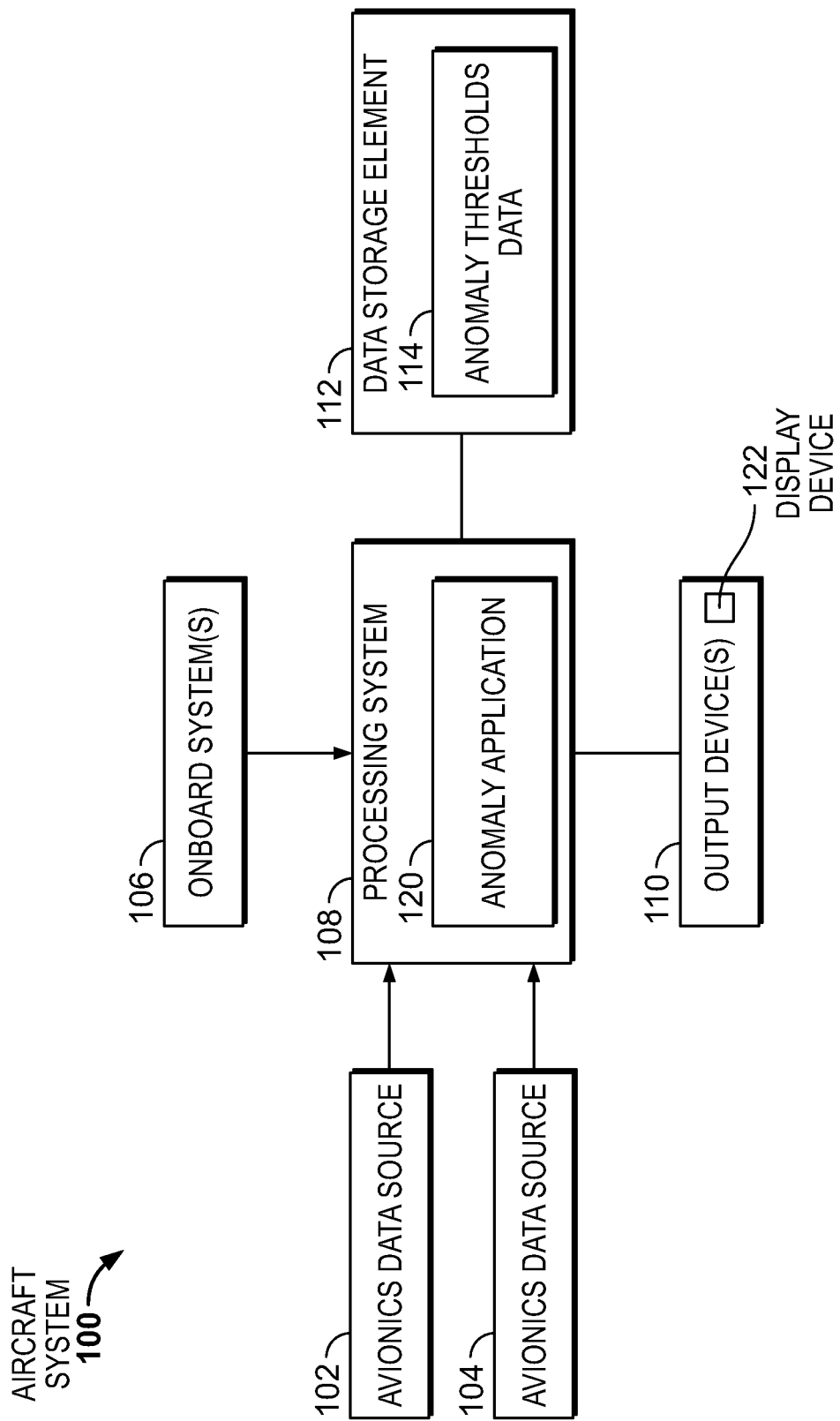
FIG. 1 is a block diagram of an aircraft system in an exemplary embodiment.

Embodiments of the subject matter described herein generally relate to systems and methods for predicting and depicting data anomalies in data from one or more avionics data sources. While the subject matter described herein could be utilized in various applications or in the context of various different types of vehicles (e.g., automobiles, marine vessels, trains, or the like), exemplary embodiments are described herein primarily in the context of avionics systems and sensors located onboard or otherwise associated with an aircraft.

Embodiments provide methods and systems for depicting predicted anomalous sensor behavior to pilots. Some existing data comparators merely detect and indicate a discrepancy between redundant data sources (e.g., airspeed) upon exceeding a threshold (e.g., Indicated Air Speed (IAS) disagree when the data for the display of the captain and the data for the display of the First Office (FO) differ by greater than 5 knots). The present disclosure provides user interfaces that temporally depict the onset of a sensor output anomaly in terms of uncertainty and probability. The user interface may include an anomaly or failure flag associated with a time scale defining a future time in which an anomaly condition is predicted to commence. The user interfaces may also temporally depict the conclusion of the anomaly in terms of uncertainty and probability. The anomaly presentations described herein may include adaptive components such as a time axis that auto-scales to allow pilots to quickly determine how long before anomaly onset, anomaly alerts being suppressed/enabled during certain phases of flight (e.g., takeoff and landing) and expanding a y-axis to depict multiple anomalies, when necessary. Anomalies may not be depicted when they are believed to occur beyond 10 minutes from the present. Anomalies may not be depicted when they are believed to occur less than 15 seconds from present to avoid operator/pilot confusion because such anomalies would transition from predicted to current rapidly and generate two alerts in succession.

Providing information regarding the onset and termination of data anomalies will enhance pilot situational awareness, which can have a positive impact on safety. The proposed display elements provide a method to inform crew regarding the onset and conclusion of data anomalies. In terms of benefits to the crew, these display elements will mitigate startle/surprise reactions from pilots that can lead to poor decision making. The display elements could be integrated into flight decks or Electronic Flight Bag (EFB) devices.

In embodiments, if observed values from an avionics data source are trending toward an anomaly, a prediction is initiated to estimate when the threshold will be crossed. As the observed values approach the anomaly threshold, a prediction is calculated. By calculating when the prediction line will cross the anomaly threshold, the systems and methods described herein estimate a time in the future relative to the present (or current time). This calculation is performed repeatedly to update the prediction as changes occur in the observed values. The predicted time of onset of an anomalous condition being determined (defined by a threshold being crossed) is displayed on a display device associated with the aircraft. Following the prediction of a data anomaly, the anomaly onset may be depicted additionally in terms of temporal uncertainty. The temporal display elements described herein are designed so as not to cause confusion and to allow pilots to extract the temporal prediction and prediction variance information at a glance. In one embodiment, bounded visual encodings are effective for displaying the future time prediction and its uncertainty. Bounded depictions are used when the distribution of values inside an interval are equally likely or there is not enough information to make statistical assumptions. Such visualizations may be in the form of gradients.

In one embodiment, a time component is added to failure or anomaly flags, which may be presented on a Primary Flight Display (PFD). Failure flags are typically used to indicate a source system failure and they replace the information that would normally be presented on the PFD in this location. In one embodiment, an augmented presentation method is provided by embedding the failure or anomaly flag within a timescale (e.g. 2D) or time axis that presents lower and upper time bounds predicting the onset of the anomaly. This preserves the familiarity of the failure or anomaly flag, and where they typically appear. In some embodiments, as time passes, and the predicted anomaly approaches, a failure or anomaly flag icon is animated, moving along a time axis toward 0, representing the present. In a variation of this presentation method, the icon location remains fixed and the time scale moves to the right, which also has the effect of moving the icon closer to 0. In other embodiments, the augmented failure or anomaly flags described herein could, additionally or alternatively, be presented on another display, such as the Engine-Indicating and Crew-Alerting System (EICAS), Electronic Centralized Aircraft Monitor (ECAM) and/or the EFB.

The system and methods may output, on the display device, that an avionics data source is anomalous and may additionally output an identification on which data source is anomalous.

In embodiments, when an anomaly condition is determined to have occurred, associated display elements (e.g. display elements that rely on data from the faulty avionics data source) are removed from the display.

A similar approach to predicting the onset of an anomaly condition could, additionally or alternatively, be used to predict the end of the anomalous condition. This could reduce startle/surprise and allow pilots to prepare for the return of display elements. Additionally, it could provide an opportunity for pilots to dismiss or accept the information being returned to the display.

In embodiments, the systems and methods derive an anomaly metric from the data from the avionics data source. The anomaly metric can be any metric able to predict an anomaly condition and where comparison with a threshold is meaningful to distinguish anomalous and normal conditions. In an embodiment, for each anomaly metric, a lower disagree/anomaly threshold (which may be referred to as a second or minor threshold) is established to initiate predictions for a potential trend towards anomaly. Further, a higher disagree/anomaly threshold (which be referred to as a first or major threshold) is established to demarcate non-anomalous and anomalous conditions. Thus, at least two thresholds exist. When a major anomaly threshold is exceeded, a current anomaly is determined. When a minor anomaly threshold is exceeded, prediction of when the major anomaly threshold will be crossed is initiated.

In embodiments, the prediction methodology can utilize the anomaly metric data in a time window from the time when the minor anomaly threshold is exceeded to current time. Historical anomaly metric data from before the time window may also be used. A prediction function processes the anomaly metric data from at least the time window to estimate a future time when the major threshold will be exceeded. The prediction function may utilize extrapolation. For example, the prediction function may incorporate at least one of: linear extrapolation, polynomial extrapolation and autoregressive models.

In some embodiments, the prediction of the future time will also estimate a time interval representing an estimate uncertainty as to when the major threshold will be breeched. The prediction interval can be defined by the estimated forecast variance, which may depend on the statistics of the residual error.

The anomaly metric can indicate frozen sensors, unexpected sudden jumps, larger than expected variance beyond existing disagree logic, gradual drift, etc. Sudden jumps may be defined by |sensor @time t−sensor @time t−1|>major threshold or some variant thereof indicating an off-trend jump in sensor value. Frozen sensors can be identified by data that lacks the typical measurement noise existent in the sensors. One example calculation can be (max sensor value−min sensor value) for last 30 sec<major threshold or some variant thereof indicating data values that are outside of a noise band that encompasses most data points. Gradual drift may be defined by (max Δsensor value−Δsensor value) for last 30 seconds>major threshold or some variant thereof that is capable to define data drift. Variance of the sensor is larger than usual and can be defined by standard deviation in last 20 seconds>major threshold. These are but some examples of possible anomaly metrics. Different analysis intervals than 20 or 30 seconds could be utilized. Further, it would be evident to the skilled person that other anomaly metrics could be defined that are able to identify an anomalous condition for a data source. For example: joint probability of Angle of Attack and Pitch can be an anomaly metric, where, if it is below a threshold, there would be an anomaly condition. An anomaly metric that combines more than one type of anomaly condition could also be established.

FIG. 1 depicts an exemplary embodiment of an aircraft system 100 suitable for detecting data anomalies with respect to one or more avionics data sources 102, 104 onboard an aircraft. The illustrated system 100 includes a plurality of avionics data sources 102, 104 and one or more additional onboard systems 106 coupled to a processing system 108 that implements, executes, or otherwise supports an anomaly application 120 capable of detecting, predicting and depicting an anomalous condition with respect to one of the avionics data sources 102, 104 and providing one or more indicia of the data anomaly via an output device 110, such as a display device 122. It should be appreciated that FIG. 1 is a simplified representation of an aircraft system 100 for purposes of explanation and not intended to limit the subject matter in any way. In this regard, it will be appreciated that in practice, an aircraft system 100 onboard an aircraft may include any number of different data sources and onboard systems configured to support operation of the aircraft, and the subject matter described herein is not limited to any particular type or number of onboard data sources or systems.

In the illustrated embodiment, the avionics data sources 102, 104 generally represent an electrical component or device that outputs or otherwise provides one or more electrical signals indicative of a value for a metric that is correlative to or indicative of one or more characteristics (or conditions) sensed, measured, detected, or otherwise quantified by one or more sensing elements (or sensors). In various embodiments, one or more of the avionics data sources 102, 104 includes or is otherwise realized as a sensing arrangement comprising one or more sensing elements that sense, measure, detect, or otherwise quantify a characteristic and output one or more electrical signals representative of the value or state of that characteristic. For example, an avionics data source 102, 104 onboard an aircraft could include, without limitation, one or more angle of attack sensors, pressure sensors, inertial sensors, velocity sensors, accelerometers, gyroscopes, pitot tubes, barometers, or radio altimeters. In some embodiments, the avionics data sources 102, 104 are realized as redundant sensors or systems that sense, measure, detect, or otherwise quantify the same characteristic.

In some embodiments, one or more of the avionics data sources 102, 104 is realized as an onboard system, device, or component that calculates, computes, calibrates, estimates, or otherwise determines a current value for a metric based on one or more current output values from one or more sensors, systems, or other data sources onboard the aircraft. For example, an avionics data source 102, 104 could be a navigation system, inertial reference system, flight control system, flight management system (FMS), or other system that calculates a value for a metric using an output value from one or more other data sources or systems onboard the aircraft.

In the embodiment of FIG. 1, the onboard system(s) 106 generally represent any sort of electrical, mechanical, hydraulic, pneumatic, environmental, or propulsion systems configured to provide information or data that characterizes or is otherwise indicative of a current operational status of the vehicle. For example, in the case of an aircraft, the onboard systems 106 could include or otherwise be realized as any one or more of the following: a flight management system (FMS), a communications system, a navigational system, a weather system, a radar system, an autopilot system, an autothrust system, a landing gear system, a flight control system, hydraulics systems, pneumatics systems, environmental systems, aircraft systems, engine systems, trim systems and/or another avionics system. As described in greater detail below, the processing system 108 is coupled to the onboard system(s) 106 to obtain information indicative of the current operational status of the aircraft, such as, for example, the current flight phase, the current altitude, the current aircraft configuration, the current meteorological conditions, and/or other operating conditions that may influence the relationships between the output data provided by other onboard data sources 102, 104. For example, mathematical or statistical relationships between outputs from different avionics data sources 102, 104 may vary during flight depending on the current phase of flight, the current physical configuration of the aircraft, the current meteorological conditions (e.g., temperature, winds, precipitation, and/or the like).

In exemplary embodiments, the output device 110 includes one or more electronic display devices 122 onboard the aircraft for presenting data and/or information provided by one or more avionics data sources 102, 104 onboard the aircraft. In exemplary embodiments, a display device 122 is coupled to the processing system 108, with the processing system 108 and/or anomaly application 120 providing graphical indicia of data anomalies to a pilot or other vehicle operator on the display device. For example, the processing system 108 and/or anomaly application 120 may modify the rendering of potentially anomalous output data provided by an avionics data source 102, 104 on the display device 122 to indicate that the output data is potentially unreliable, or the processing system 108 and/or anomaly application 120 may automatically mark, designate, or otherwise indicate that presented output data from the avionics data source 102, 104 is potentially unreliable. In yet other embodiments, the processing system 108 and/or anomaly application 120 may mask or remove previously presented output data from the avionics data source 102, 104 from the display in response to identifying an anomalous condition with respect to that avionics data source 102, 104. Additionally, in some embodiments, the output device 110 may include a speaker or other audio output device that may be utilized by the processing system 108 and/or anomaly application 120 to provide an auditory indication of a potentially unreliable avionics data source 102, 104. In embodiments, the output on the display device 122 includes a prediction of a time when an anomalous condition is detected and depicted. Further, the predicted time may be in the form of a time interval based on statistical analysis of the anomaly metric by a prediction function.

Figure 2:
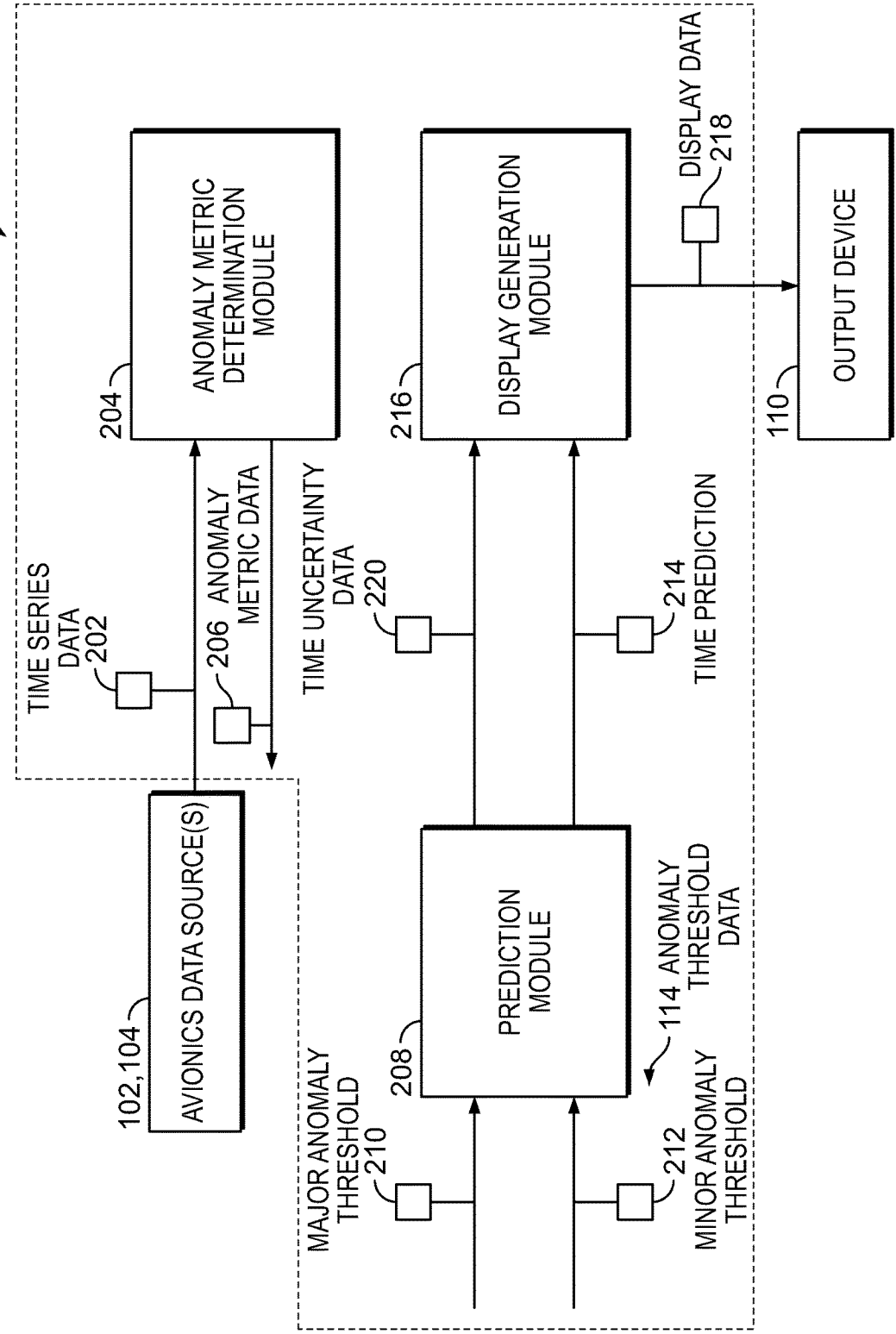
FIG. 2 is a data flow diagram of an exemplary data anomaly detection, prediction and depiction application for implementation by, or in conjunction with, the system of FIG. 1 in accordance with an exemplary embodiment.

The processing system 108 generally represents the hardware, software, and/or firmware components (or a combination thereof), which is communicatively coupled to the various elements of the system 100 and configured to support the anomaly detection, prediction and depiction application 200 of FIG. 2 and perform additional tasks and/or functions described herein. Depending on the embodiment, the processing system 108 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In the illustrated embodiment, the processing system 108 includes or otherwise accesses a data storage element 112 (or memory) capable of storing code or other computer-executable programming instructions that, when read and executed by the processing system 108, cause the processing system 108 to generate, implement, or otherwise execute the anomaly application 120 that supports or otherwise performs certain tasks, operations, functions, and/or processes described herein.

The data storage element 112 generally represents any sort of non-transitory short- or long-term storage media capable of storing code, computer-executable programming instructions, and/or other data. Depending on the embodiment, the data storage element 112 may include or otherwise be physically realized using random access memory (RAM), read only memory (ROM), flash memory, registers, a hard disk, or another suitable data storage medium known in the art or any suitable combination thereof. Moreover, in some embodiments, the data storage element 112 may be realized as a database or some other remote data storage or device that is communicatively coupled to the processing system 108 via a communications network. In such embodiments, data maintained at the data storage element 112 may be downloaded or otherwise retrieved by the processing system 108 and stored locally at the processing system 108 or an onboard data storage element.

In exemplary embodiments, the data storage element 112 stores or otherwise maintains anomaly threshold data 114 that includes major and minor threshold values for one or more anomaly metrics. The threshold data may be adaptive over time and determined based on longer term historical anomaly metric data, may be dynamically determined based on shorter term statistical analysis of the anomaly metrics data or may be static, absolute values.

FIG. 2 depicts an exemplary embodiment of an anomaly detection, prediction and depiction application 200 suitable for use in detecting data anomalies in an aircraft system, such as the aircraft system 100 of FIG. 1. The application 200 may be part of the more global anomaly application 120 or otherwise executed by the processing system 108. The various tasks performed in connection with the illustrated application 200 may be implemented using hardware, firmware, software executed by processing circuitry, or any combination thereof. For illustrative purposes, the following description may refer to elements mentioned above in connection with FIG. 1. In practice, portions of the anomaly detection, prediction and depiction application 200 may be performed by different elements of the system 100; that said, for purposes of explanation, the anomaly detection, prediction and depiction application 200 may be described herein in context of being performed primarily by the processing system 108 and/or the anomaly application 120. It should be appreciated that the anomaly detection, prediction and depiction application 200 may include any number of additional or alternative tasks, the tasks need not be performed in the illustrated order and/or the tasks may be performed concurrently, and/or the anomaly detection, prediction and depiction application 200 may be incorporated into a more comprehensive procedure or process having additional functionality not described in detail herein. Moreover, one or more of the tasks shown and described in the context of FIG. 2 could be omitted from a practical embodiment of the anomaly detection, prediction and depiction application 200 as long as the intended overall functionality remains intact. Additionally, for purposes of explanation, the anomaly detection, prediction and depiction application 200 is primarily described herein in the context of an aircraft or aviation-related application; however, it should be appreciated that the anomaly detection, prediction and depiction application 200 is not necessarily limited to aircraft systems, and could be implemented in an equivalent manner for any vehicular system including any number of sensors or data sources.

The anomaly detection, prediction and depiction application 200 receives time series data 202 from one or more avionics data sources 102, 104 outputting time series data 202 that will be processed to determine any anomalous conditions. Part of that processing includes an anomaly metric determination module 204 that derives an anomaly metric from one or more values of the time series data 202. Generally, more than one value will be utilized in deriving the anomaly metric. In some embodiments, the anomaly metric may be determined based on a series of data points in the time series data 202 from the most recent value and extending back in time by a certain count of data points or by a certain period of time. The anomaly metric may be a parameter for detecting value jumps between neighboring data points or jumps from a minimum to a maximum value within the time window. The anomaly metric may be a parameter for detecting lack of noise in the data over the time window, which would potentially indicate a frozen or otherwise malfunctioning data source. The anomaly metric may be a parameter for detecting data drift in the time window. The anomaly metric may be based on standard deviation over the time window. The anomaly metric may represent a disagreement between any two sensors (not planned a priori) such as redundant sensors. A combination of such anomaly metrics may be utilized. The time window can be adapted to the anomaly metric and may be at least 10 seconds in some embodiments. Other anomaly metrics may be appropriate and those described herein are a non-exhaustive selection of available possibilities.

The anomaly detection, prediction and depiction application 200 includes a prediction module that receives anomaly metric data 206 (which may also be time series data) from the anomaly metric determination module 204. The prediction module 208 may run continuously or may be invoked when one or more conditions are met. One exemplary such condition would be when one or more values (or a combination thereof such as an average) of the anomaly metric data 206 cross (either above or below depending on the type of anomaly metric) the minor anomaly threshold 212. As shown in FIG. 2, the prediction module 208 receives the anomaly threshold data 114 from the data storage element 112, which includes the major anomaly threshold 210 and the minor anomaly threshold 210. When the minor anomaly threshold 212 is determined by the prediction module 208 to have been crossed by the anomaly metric data 206, the prediction module 208 commences predicting when the anomaly metric data 206 will cross the major anomaly threshold 210. That is, the prediction module 208 determines when the anomaly metric data 206 will be deemed anomalous and, consequently, that the associated avionics data source 102, 104 will be considered to be in an anomalous condition. The prediction module 208 can execute one or more prediction functions such as linear or polynomial or other data extrapolation functions as non-exhaustive examples. The prediction function makes the prediction based on an extrapolation of historical anomaly metric data 206 over a predetermined time window that is configurable. The prediction module 208 may update its time prediction 214 at each instance (or every predetermined number of instances) of new anomaly metric data 206.

Figure 3:
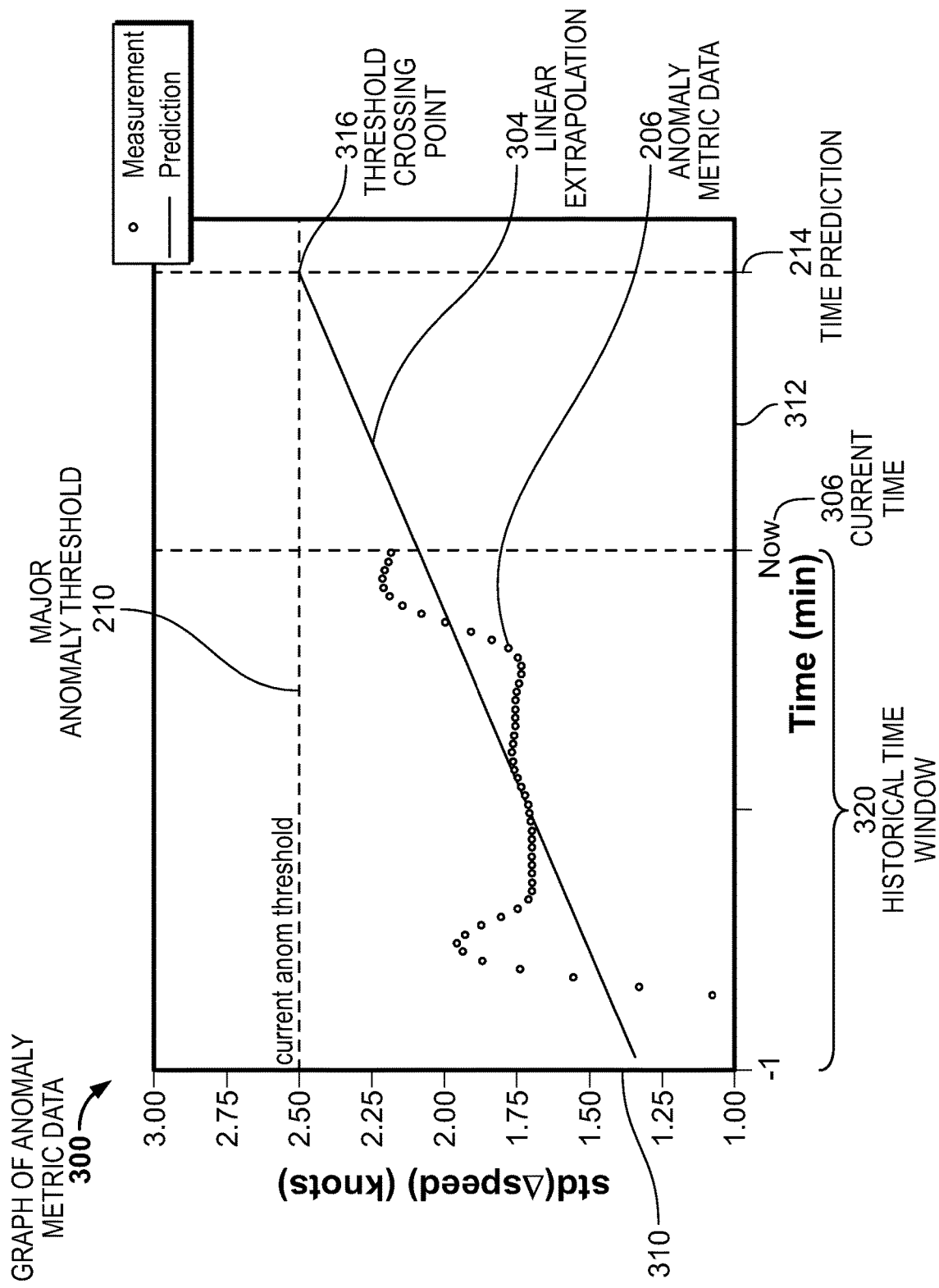
FIG. 3 depicts measured and predicted anomaly metrics on a time series graph as determined by the system of FIG. 1, in an exemplary embodiment.

FIG. 3 depicts an exemplary graph 300 of anomaly metric data 206 and other data components. The graph 300 illustrates a time x-axis 312 and an anomaly metric y-axis. In the present example, the anomaly metric is standard deviation in speed data received from a speed sensor as an example of an avionics data source 102, 104. The graph 300 plots the anomaly metric data 206 (which is speed standard deviation data in this example). The graph 300 further illustrates the major anomaly threshold 210 for this example. The prediction module 208 applies, in the present embodiment, a linear extrapolation to the anomaly metric data 206 based on a data set over a historical time window 320 preceding current time 306. The historical time window 320 is 1 minute in the past in the depicted example but this time window can be configured to achieve optimum results and balancing processing resources. The linear extrapolation 304 (as an example of a prediction function) provides a time prediction 214 of when the anomaly metric data 206 will cross the major anomaly threshold 210 at the threshold crossing point 316. The time prediction 214 is a future time relative to the current time 306.

In the example of FIG. 3, the prediction module 208 may run continuously or at least not be invoked by the anomaly metric data crossing a minor anomaly threshold 212. Further, the prediction function (linear extrapolation 304 in this embodiment) run by the prediction module 208 outputs the time prediction 214 of when the major anomaly threshold 210 will be crossed and does not necessarily output time uncertainty data 220 providing a time variance window around the time prediction 214. It should further be appreciated that the graph 300 is for illustration purposes but the prediction module 208 would operate on the anomaly metric data 206 directly and would not need to draw such a graph 300 in order to perform the prediction.

Figure 4:
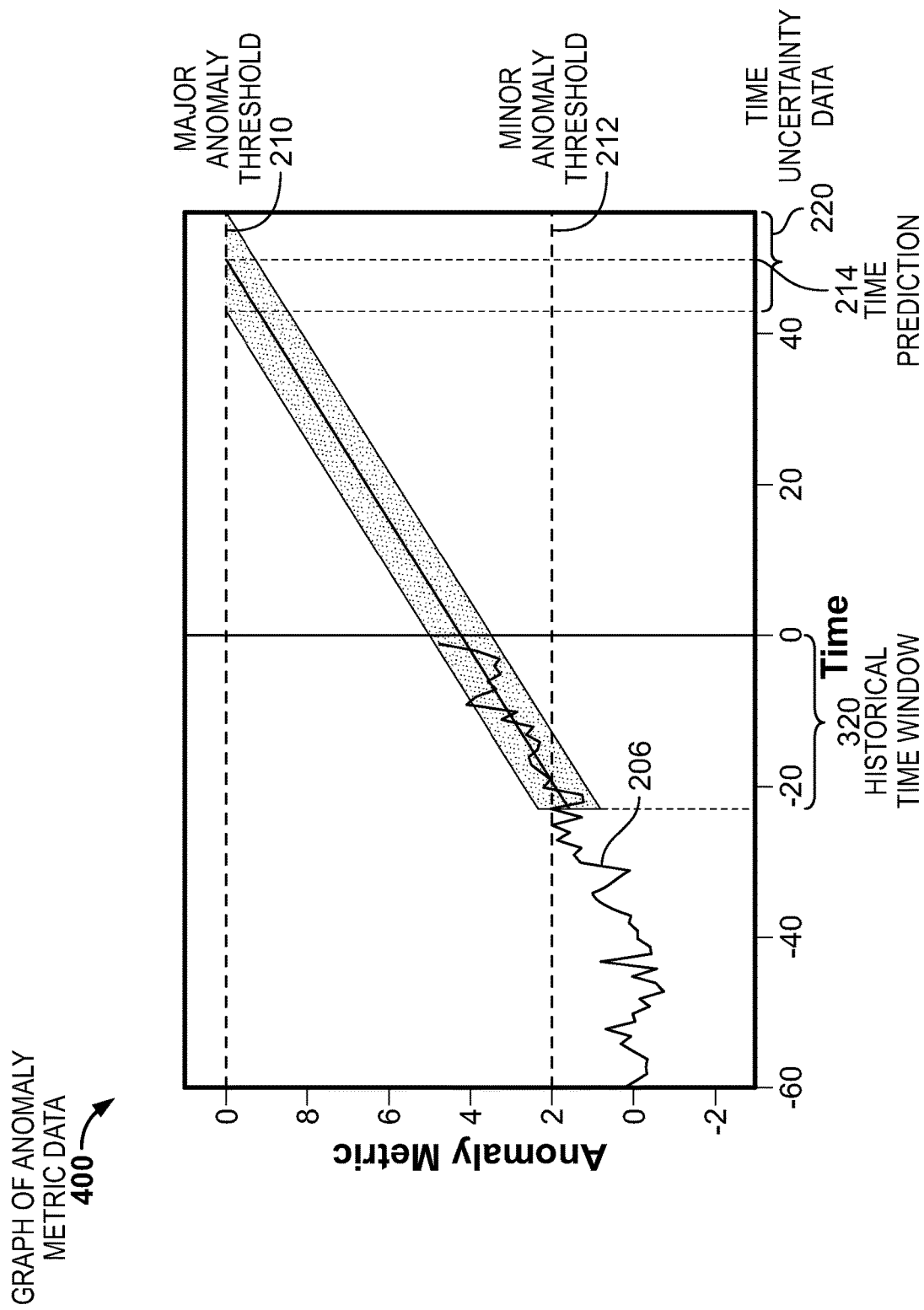
FIG. 4 depicts measured and predicted anomaly metrics on another time series graph as determined by the system of FIG. 1, in another exemplary embodiment.

In the embodiment of FIG. 4, another graph 400 of anomaly metric data is illustrated in an example by which the prediction module 208 is invoked by the anomaly metric data 206 crossing the minor anomaly threshold 212. This begins the prediction process by which the prediction module 208 extrapolates data in the historical time window 320 to determine when the major anomaly threshold 210 will be crossed. The historical time window 320 is set so as to start including data in the prediction from the time point when the minor anomaly threshold 212 is crossed. Such an adaptive historical time window 320 is an optional feature and other methods of determining a length of the historical time window 320 or a fixed length historical time window 320 may be used. As illustrated in FIG. 4, the prediction module 208 determines not only the time prediction 214 when the major anomaly threshold 210 is predicted to be crossed but also time uncertainty data 220 representing a calculated time range when the major anomaly threshold is considered like to be crossed. The time range can be determined based on statistical analysis of variance of the anomaly metric data 206 over the historical time window 320. The time range may be set based on probabilistic analysis of the anomaly metric such as a constraint to predicting when the major anomaly threshold 210 will be crossed within a given percentage certainty.

Figure 5:
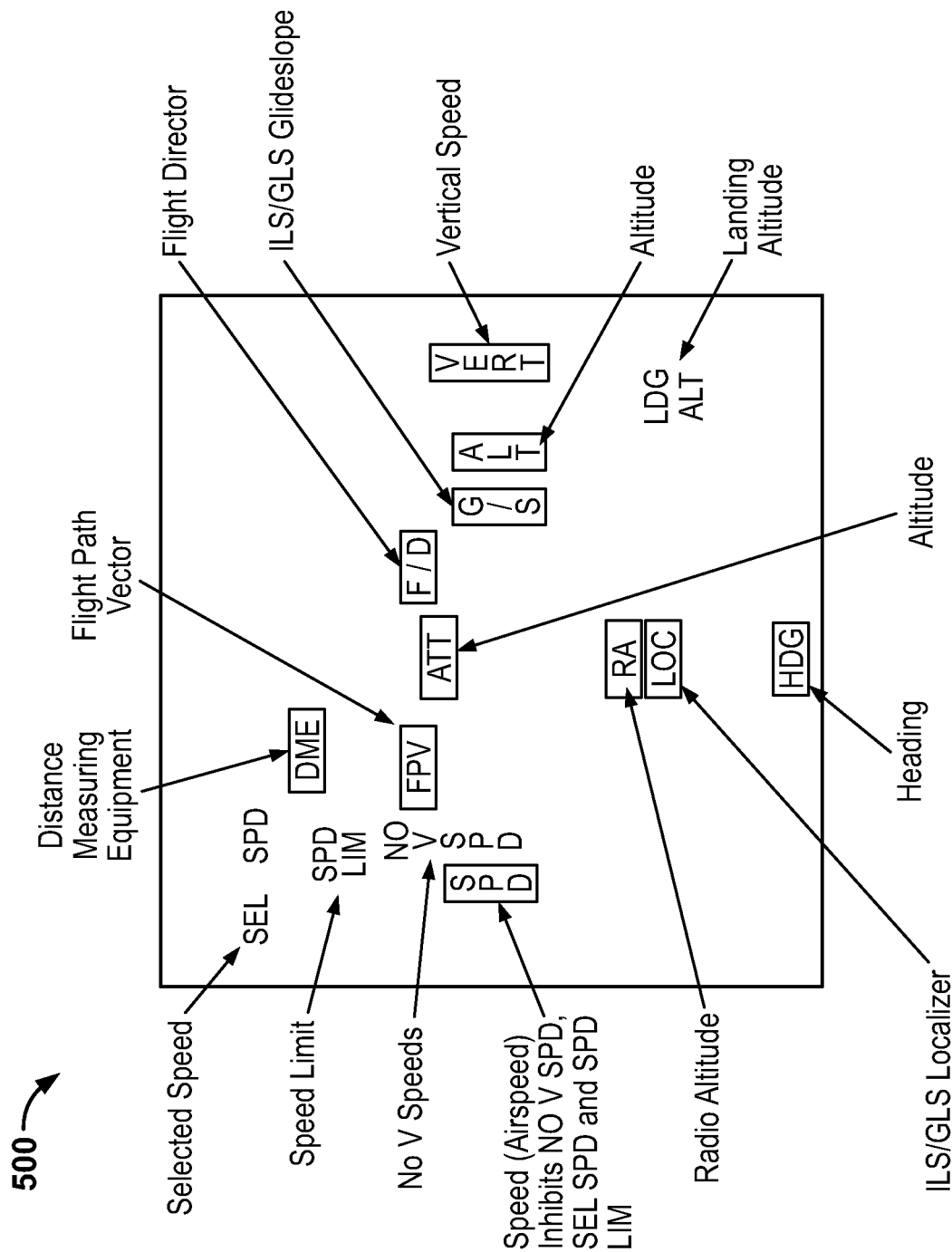
FIG. 5 depicts exemplary failure flag types, in accordance with an exemplary embodiment.

Referring again to FIG. 2, the anomaly detection, prediction and depiction application 200 includes a display generation module 216 that receives the time prediction 214 and the optional time uncertainty data 220 and generates display data 218 based thereon. Various displays are possible that indicate to the viewer a future time when the data from an avionics data source 102, 104 will be considered in an anomalous condition. Referring to FIG. 5, a variety of potential failure flags are illustrated as non-exhaustive examples of the type of anomalous condition that can be identified by the detection, prediction and depiction application 200. For example, the anomaly (and associated anomaly flag) may relate to time series data from, as exemplary avionics data sources 102, 104: Distance Measuring Equipment (DME), SPeeD (SPD), Radio Altitude (RA), Instrument Landing System (ILS), GLideSlope (GLS) Localizer, HeaDinG (HDG), ATTitude (ATT), ALTitude (ALT), VERTical speed (VERT) and/or Flight Director (F/D). The time series data 202 from one or more of these avionics data sources 102, 104 can be devolved into anomaly metric data 206, which is analyzed to generate a prediction of when one or more anomalous condition threshold will be crossed. As will be described further herein, the failure or anomaly flags 500 or other depiction of an anomalous condition can be supplemented with an indication of when the major anomaly threshold is predicted to be crossed by the anomaly metric data 206. In some embodiments, the failure or anomaly flags 500 can be augmented with an indication of the time uncertainty represented by a time range including estimated minimum and maximum times when the major anomaly threshold will be crossed. The failure or anomaly flags 500 may be animated to move relative to a time indication in correspondence with the passage of time. The failure or anomaly flags 500 may graphically differentiate between a prediction of a future time anomaly condition and a current anomaly condition (when the major anomaly threshold has actually been crossed). The failure or anomaly flags 500 may identify a specific type of anomaly condition from a plurality of types of anomaly condition such as indicating the avionics data source 102, 104 that has been determined to be anomalous.

Figure 6:
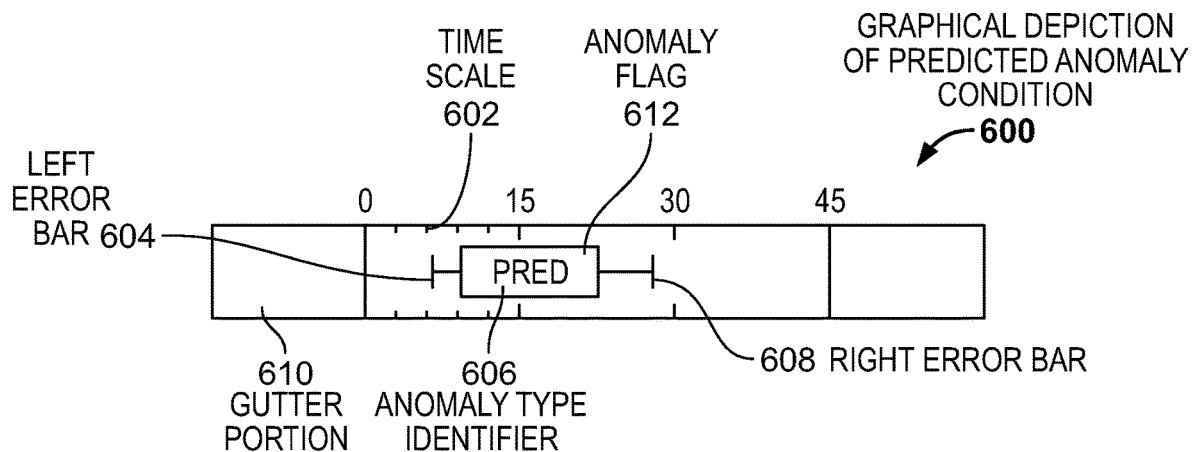
FIG. 6 depicts an exemplary user interface including an anomaly flag predicting a future time when a data anomaly is expected to occur, in accordance with an exemplary embodiment.

Some examples of anomaly or failure flags according to embodiments of the present disclosure are provided in FIGS. 6 to 9. In FIG. 6, a graphical depiction 600 of a predicted anomaly condition is presented. The graphical depiction 600 is displayed on the display device 122. The graphical depiction 600 includes an anomaly or failure flag 612 positioned on a time scale 602. The position on the time scale is set to correspond with the time prediction 214 from the prediction module 208. Although not necessarily provided, the present embodiment further includes left and right error bars 604, 608 that have a length of extension along the time scale set based on the time uncertainty data 220 from the prediction module 208. Other manners of graphically indicating the time uncertainty data along a timescale are envisaged. The present embodiment shows text to indicate that the anomaly flag is a PREDiction. However, this generic text to indicate any prediction may be replaced with an anomaly type identifier describing any one of: Distance Measuring Equipment (DME), SPeeD (SPD), Radio Altitude (RA), Instrument Landing System (ILS), GLideSlope (GLS) Localizer, HeaDinG (HDG), ATTitude (ATT), ALTitude (ALT), VERTical speed (VERT), Flight Director (F/D), etc. The timescale 602 may indicate any units of time such as seconds or minutes. A gutter portion 610 may be located adjacent the timescale 602 and the anomaly flag may move from being located along the timescale 602 to being located in the gutter portion 610 when there is a change from a predicted anomaly status to a current anomaly status (e.g. when the anomaly metric data transitions from trending towards crossing the major anomaly threshold 210 to having already crossed the major anomaly threshold 210).

Figure 7:
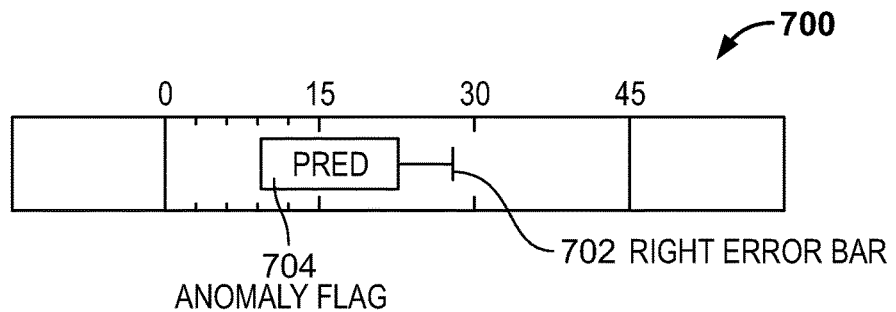
FIG. 7 depicts another exemplary user interface including anomaly flag predicting a future time when a data anomaly is expected to occur, in accordance with an exemplary embodiment.
Figure 8:
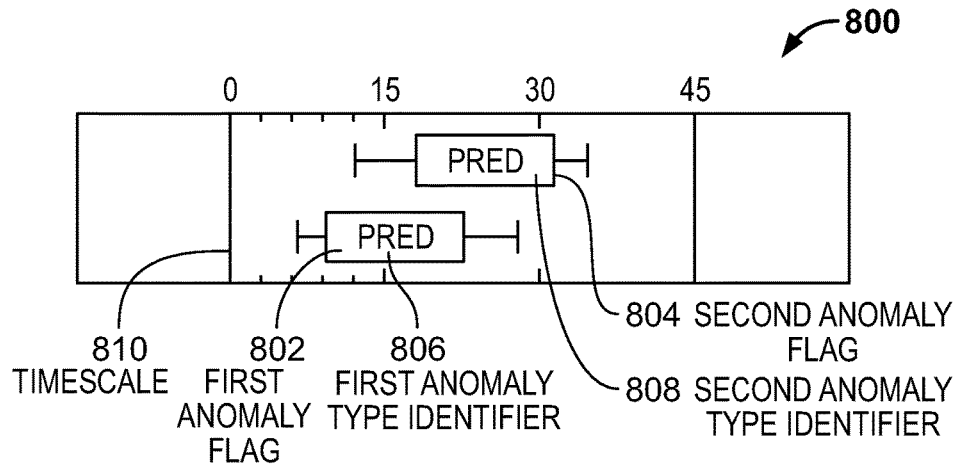
FIG. 8 depicts yet another exemplary user interface including a failure flag predicting a future time when a data anomaly is expected to occur, in accordance with an exemplary embodiment.

In an exemplary modification shown in FIG. 7. the graphical depiction 700 includes just a single error bar 702 projecting from a main body of the anomaly flag 704, which is a right error bar 702 in the present embodiment. In FIG. 8, another modification is shown in which first and second anomaly flags 802, 804 are provided along the same timescale 810. The first and second anomaly flags 802, 804 may relate to data anomalies for different avionics data sources 102, 104 and may include respective first and second anomaly type identifiers 806, 808. In FIG. 8, a size of a y-axis (or vertical extent) of the graphical depiction 800 is adjusted depending on a number of anomaly flags 802, 804. The anomaly flags 802, 804 are stacked in the graphical depiction and may move independently from each other along the timescale 810. The more anomaly flags stacked in the graphical depiction 800, the more space is required along the y-axis.

Figure 9A:
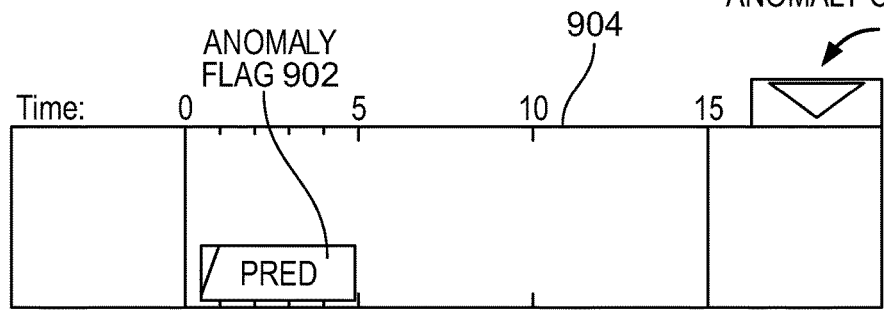
FIGS. 9A to 9C depict a sequence of user interfaces of an animated anomaly flag, in accordance with an exemplary embodiment.
Figure 9B:
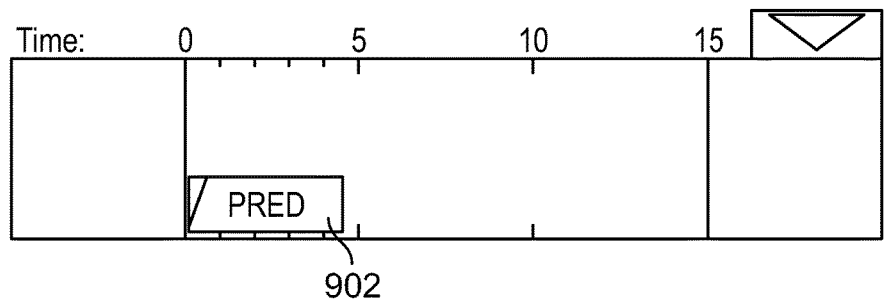
Figure 9C:
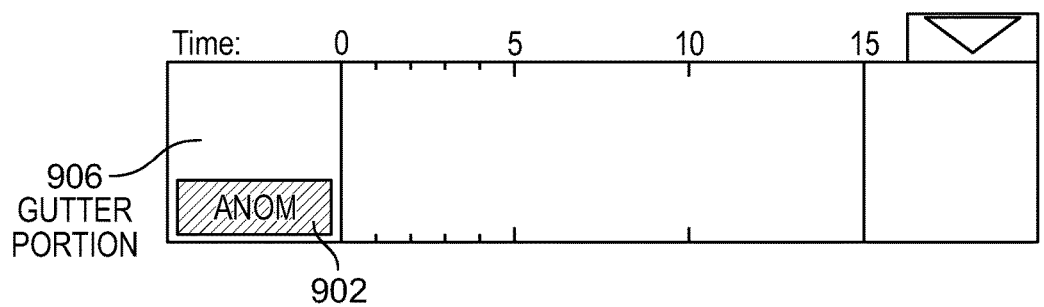

FIGS. 9A to 9C illustrate an exemplary animated graphical depiction 900 of a prediction anomaly condition according to one embodiment of the present disclosure. In FIGS. 9A and 9B, the anomaly flag 902 is shown to move relative to the timescale 904 in accordance with an updated time prediction 214 from the prediction module 208 and as the prediction moves closer to the present with the passage of time. In FIG. 9C, there has been a status change from a predicted anomaly condition to a current anomaly condition such that the anomaly flag 902 moves from being located along the timescale 904 to being located in a gutter portion 906 adjacent the timescale 904. Additionally, or alternatively, the anomaly flag may indicate the change of status to being a current anomaly condition by visually differentiating the anomaly flag 902 such as by using changing coloring or changing alphanumeric text or both. It should be noted that the anomaly flag 902 does not have error bars in the present embodiment although this feature could be incorporated. Instead, the length of the anomaly flag 902 along the timescale 904 is itself set based on the time uncertainty data 220 from the prediction module 208.

A further animation that may be included is auto-scaling of the timescale 904 such that the time granularity of the of the time scale is decreased (shortened in time) as the time prediction 214 approaches current time. Thus, a time prediction 214 of greater than one minute may correspond to an anomaly flag located on a timescale that is at least one minute from minimum time to maximum time on the timescale (and may have minutes units) whereas a time prediction 214 of less than one minute may correspond to an anomaly flag located on a timescale that is less than one minute (and may have seconds time units).

In some embodiments, anomalies are not depicted when they are predicted to occur beyond a maximum amount of time (e.g. 10 minutes) from the present as this may be of questionable utility, Furthermore, or alternatively, anomalies are not depicted when they are predicted to occur less than a minimum amount of time (e.g. 10 seconds) from the present, which may serve to prevent confusion because such anomalies would transition from predicted to current rapidly and generate two alerts in succession.

The systems and methods described herein may also, or alternatively, provide a time prediction of when an avionics data source 102, 104 is predicted to transition from being deemed currently anomalous to being deemed operating properly or normally. That is, a prediction will be depicted of when the avionics data source 102, 104 will cease to be deemed to be providing anomalous data. By extension of that described with respect to FIG. 2, the prediction module 208 initiates extrapolation of the anomaly metric data 206 when the values cross a minor functioning threshold to determine a time prediction 214 of when the values will cross a major functioning threshold. The time prediction 214 and optional time uncertainty data 220 can be used by the display generation module 216 to provide an output indicating when an avionics data source 102, 104 will come back online to avoid any surprise/starting for the flight crew. The output predicting proper functioning of the avionics data source 102, 104 can be provided as an aural and/or visual output. The output can be a moving flag along a timescale as discussed with respect to FIGS. 6 to 9. The major functioning threshold may be the same as the major anomaly threshold.

Figure 10:
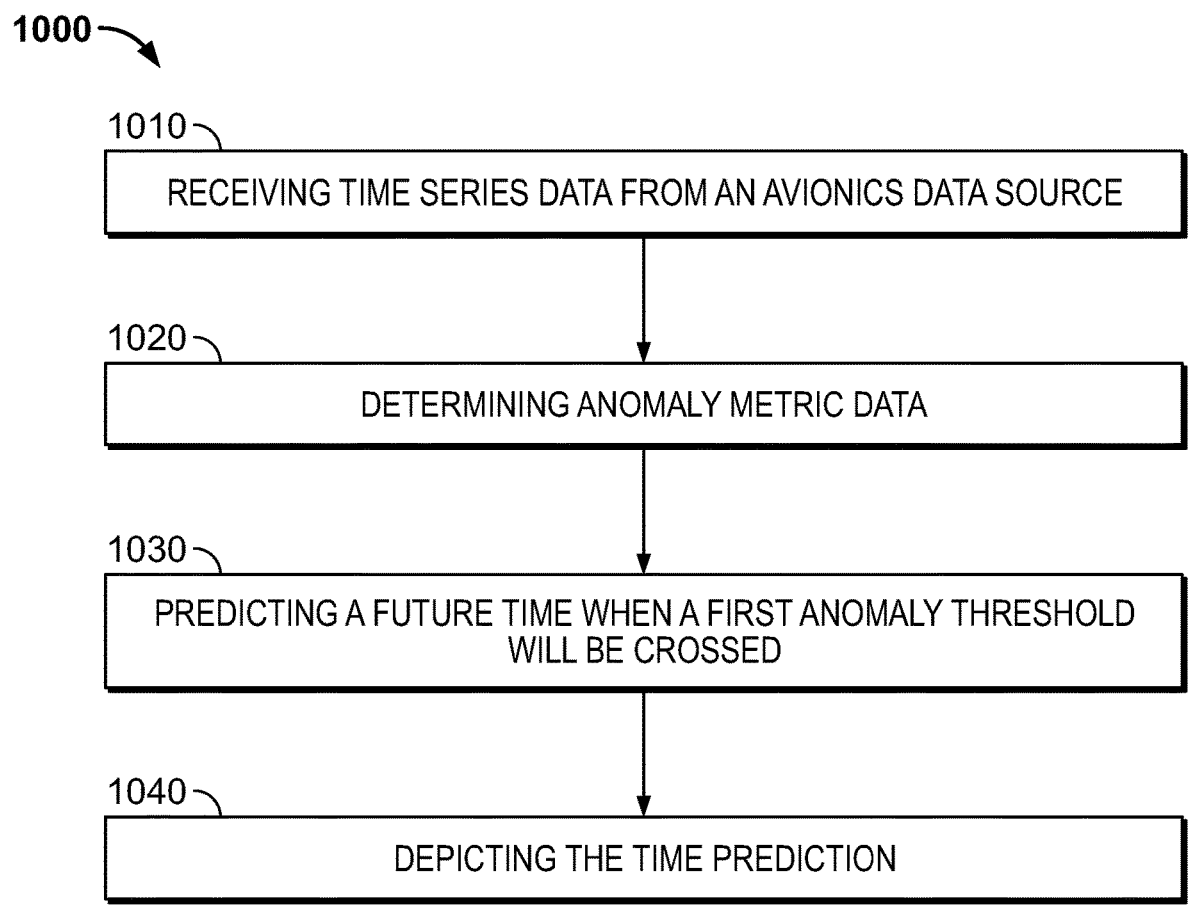
FIG. 10 is a flowchart of a method for predicting, detecting and depicting data anomalies in an avionics data sensor, in accordance with an embodiment.

A flow chart of an exemplary method 1000 of detecting, predicting and depicting data anomalies is provided in FIG. 10. The method 1000 is computer implemented by the processing system 108 of FIG. 1, specifically by the anomaly application 120 of FIG. 1. With additional reference to FIG. 2, the method includes step 1010 of receiving time series data 202 from an avionics data source 102, 104. The time series data 202 is processed to determine anomaly metric data 206 descriptive of a particular data anomaly condition. In step 1030, the anomaly metric data 206 forms the basis of a prediction of a future time when a first (major) anomaly threshold 210 will be crossed. In particular, from when the anomaly metric data 206 cross a second (minor) threshold 212, the anomaly metric data 206 is extrapolated into the future using any suitable prediction function. This extrapolation allows a time prediction 214 of when the major threshold 210 will be crossed. Further, suitable variance analysis allows a time uncertainty in the time prediction 214 to be formulated, resulting in time uncertainty data 220. In step 1040, the time prediction 214 and optionally the associated time uncertainty is depicted or otherwise output to the flight crew. In one embodiment, as described heretofore with respect to FIGS. 6 to 9, the depiction can be in form of an anomaly flag positioned on a timescale and moving relative to the timescale as the prediction is updated and as time passes and the prediction comes closer to the present time. A similar method may be implemented to predict and depict a future time when an offline (or anomalous condition) avionics data source 102, 104 will come back online (or becomes functional/operational).

Figure 11:
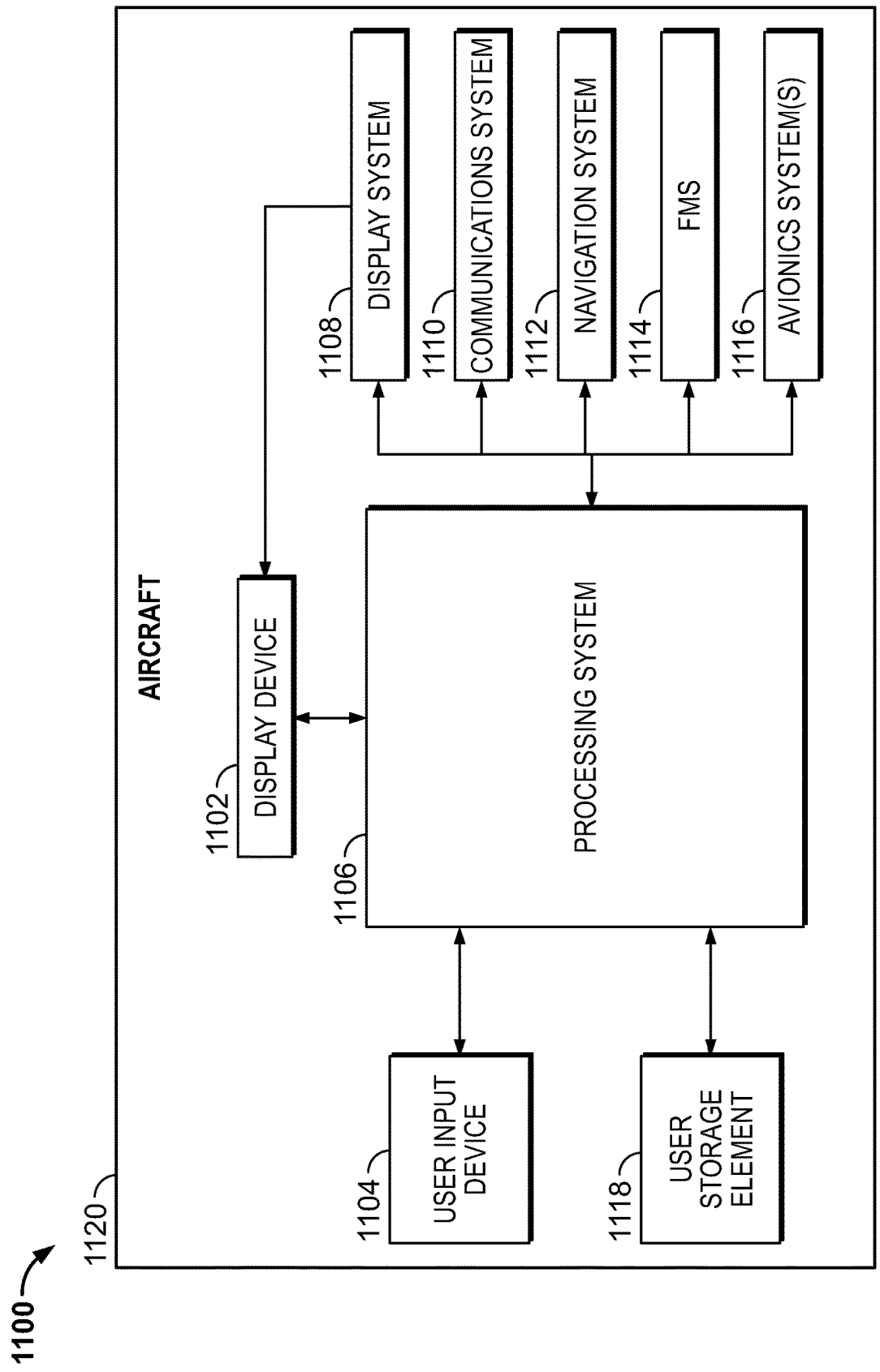
FIG. 11 depicts an exemplary embodiment of an aircraft system suitable for implementing the data anomaly detection, prediction and depiction processes described herein in accordance with one or more embodiments.

FIG. 11 depicts an exemplary embodiment of an aircraft system 1100 suitable for implementing the anomaly detection, prediction and depiction application 200 with respect to data sources onboard an aircraft 1120. The illustrated aircraft system 1100 includes, without limitation, a display device 1102, one or more user input devices 1104, a processing system 1106, a display system 1108, a communications system 1110, a navigation system 1112, a flight management system (FMS) 1114, one or more avionics systems 1116, and a data storage element 1118 suitably configured to support operation of the system 1100.

In exemplary embodiments, the display device 1102 is realized as an electronic display capable of graphically displaying flight information or other data associated with operation of the aircraft 1120 under control of the display system 1108 and/or processing system 1106. In this regard, the display device 1102 is coupled to the display system 1108 and the processing system 1106, wherein the processing system 1106 and the display system 1108 are cooperatively configured to display, render, or otherwise convey one or more graphical representations or images associated with operation of the aircraft 1120 on the display device 1102. The user input device 1104 is coupled to the processing system 1106, and the user input device 1104 and the processing system 1106 are cooperatively configured to allow a user (e.g., a pilot, co-pilot, or crew member) to interact with the display device 1102 and/or other elements of the system 1100, as described herein. Depending on the embodiment, the user input device(s) 1104 may be realized as a keypad, touchpad, keyboard, mouse, touch panel (or touchscreen), joystick, knob, line select key or another suitable device adapted to receive input from a user. In some embodiments, the user input device 1104 includes or is realized as an audio input device, such as a microphone, audio transducer, audio sensor, or the like, that is adapted to allow a user to provide audio input to the system 1100 in a "hands free" manner without requiring the user to move his or her hands, eyes and/or head to interact with the system 1100.

The processing system 1106 generally represents the hardware, software, and/or firmware components configured to facilitate communications and/or interaction between the elements of the aircraft system 1100 and perform additional tasks and/or functions to support the anomaly detection, prediction and depiction application 200 of FIG. 2 during operation of the aircraft system 1100, as described herein.

Depending on the embodiment, the processing system 1106 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 1106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 1106 includes processing logic that may be configured to carry out the functions, techniques, and processing tasks associated with the operation of the aircraft system 1100, as described herein. Furthermore, the steps of a method or algorithm described in connection with the embodiments disclosed herein may be embodied directly in hardware, in firmware, in a software module executed by the processing system 1106, or in any practical combination thereof. For example, in one or more embodiments, the processing system 1106 includes or otherwise accesses a data storage element 1118 (or memory), which may be realized as any sort of non-transitory short- or long-term storage media capable of storing programming instructions for execution by the processing system 1106. The code or other computer-executable programming instructions, when read and executed by the processing system 1106, cause the processing system 1106 to support or otherwise perform certain tasks, operations, and/or functions described herein in the context of the anomaly detection, prediction and depiction application 200. Depending on the embodiment, the data storage element 1118 may be physically realized using RAM memory, ROM memory, flash memory, registers, a hard disk, or another suitable data storage medium known in the art or any suitable combination thereof.

The display system 1108 generally represents the hardware, software, and/or firmware components configured to control the display and/or rendering of one or more navigational maps and/or other displays pertaining to operation of the aircraft 1120 and/or onboard systems 1110, 1112, 1114, 1116 on the display device 1102. In this regard, the display system 1108 may access or include one or more databases suitably configured to support operations of the display system 1108, such as, for example, a terrain database, an obstacle database, a navigational database, a geopolitical database, a terminal airspace database, a special use airspace database, or other information for rendering and/or displaying navigational maps and/or other content on the display device 1102.

Still referring to FIG. 11, in an exemplary embodiment, the processing system 1106 is coupled to the navigation system 1112, which is configured to provide real-time navigational data and/or information regarding operation of the aircraft 1120. The navigation system 1112 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 1112, as will be appreciated in the art. The navigation system 1112 is capable of obtaining and/or determining the instantaneous position of the aircraft 1120, that is, the current (or instantaneous) location of the aircraft 1120 (e.g., the current latitude and longitude) and the current (or instantaneous) altitude or above ground level for the aircraft 1120. The navigation system 1112 is also capable of obtaining or otherwise determining the heading of the aircraft 1120 (i.e., the direction the aircraft is traveling in relative to some reference). In the illustrated embodiment, the processing system 1106 is also coupled to the communications system 1110, which is configured to support communications to and/or from the aircraft 1120. For example, the communications system 1110 may support communications between the aircraft 1120 and air traffic control or another suitable command center or ground location. In this regard, the communications system 1110 may be realized using a radio communication system and/or another suitable data link system.

In an exemplary embodiment, the processing system 1106 is also coupled to the FMS 1114, which is coupled to the navigation system 1112, the communications system 1110, and one or more additional avionics systems 1116 to support navigation, flight planning, and other aircraft control functions in a conventional manner, as well as to provide real-time data and/or information regarding the operational status of the aircraft 1120 to the processing system 1106. Although FIG. 11 depicts a single avionics system 1116, in practice, the aircraft system 1100 and/or aircraft 1120 will likely include numerous avionics systems for obtaining and/or providing real-time flight-related information that may be displayed on the display device 1102 or otherwise provided to a user (e.g., a pilot, a co-pilot, or crew member). For example, practical embodiments of the aircraft system 1100 and/or aircraft 1120 will likely include one or more of the following avionics systems suitably configured to support operation of the aircraft 1120: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 1106 may obtain information pertaining to the current location and/or altitude of the aircraft 1120 and/or other operational information characterizing or otherwise describing the current operational context or status of the aircraft 1120 from one or more of the onboard systems 1108, 1110, 1112, 1114, 1116, and the current operational context may be utilized by the processing system 1106 to detect anomalies between data sources based on the current operational context (e.g., the current flight phase, etc.).

It should be understood that FIG. 11 is a simplified representation of the aircraft system 1100 for purposes of explanation and ease of description, and FIG. 11 is not intended to limit the application or scope of the subject matter described herein in any way. It should be appreciated that although FIG. 11 shows the various elements of the system 1100 being located onboard the aircraft 1120 (e.g., in the cockpit), in practice, one or more of the elements of the system 1100 may be located outside the aircraft 1120 (e.g., on the ground as part of an air traffic control center or another command center) and communicatively coupled to the remaining elements of the aircraft system 1100 (e.g., via a data link and/or communications system 1110). For example, in some embodiments, the data storage element 1118 may be located outside the aircraft 1120 and communicatively coupled to the processing system 1106 via a data link and/or communications system 1110. Furthermore, practical embodiments of the aircraft system 1100 and/or aircraft 1120 will include numerous other devices and components for providing additional functions and features, as will be appreciated in the art. In this regard, it will be appreciated that although FIG. 11 shows a single display device 1102, in practice, additional display devices may be present onboard the aircraft 1120. Additionally, it should be noted that in other embodiments, features and/or functionality of processing system 1106 described herein can be implemented by or otherwise integrated with the features and/or functionality provided by the FMS 1114. In other words, some embodiments may integrate the processing system 1106 with the 'FMS 1114. In yet other embodiments, various aspects of the subject matter described herein may be implemented by or at an electronic flight bag (EFB) or similar electronic device that is communicatively coupled to the processing system 1106 and/or the 'FMS 1114.

Referring to FIG. 11 with reference to FIGS. 1-2, the processing system 1106 and/or the 'FMS 1114 may be configured to perform the anomaly detection, prediction and depiction application 200 with respect to output data provided by any number of different onboard systems 1110, 1112, 1114, 1116. In other words, each of the avionics data sources 102, 104 could include or be realized as a different avionics system 1110, 1112, 1114, 1116 (or a sensor or another component thereof) onboard the aircraft 1120. Thus, the processing system 1106 may be able to detect or otherwise identify an anomaly with respect to one of the onboard avionics systems 1110, 1112, 1114, 1116 and diagnose the particular onboard avionics system 1110, 1112, 1114, 1116 that is the cause of the data anomaly. The processing system 1106 may predict a future time when an anomalous data source condition will commence and may output a depiction of the future time that is dynamically updated by the processing system 1106 as the predicted time approaches current time.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for depicting avionics data anomalies in an aircraft, the method comprising:
   receiving, via at least one processor, current time series data from at least one avionics data source;
   determining current anomaly metric data based on the current time series data; and
   upon a determination that the current anomaly metric data crosses a minor anomaly threshold:
      predicting, via the at least one processor, a future time when a major anomaly threshold will be crossed by future anomaly metric data associated with future time series data received at the future time based on an extrapolation of the current time series data; and
      depicting, on a display device associated with the aircraft, an indication that the at least one avionics data source will be considered to be in an anomalous condition at the future time when the major anomaly threshold will be crossed.

2. The method of claim 1, wherein the predicting step provides a time uncertainty associated with the future time when the major anomaly threshold will be crossed and wherein the depicting step includes depicting the future time when the major anomaly threshold will be crossed and the time uncertainty.

3. The method of claim 2, wherein the time uncertainty is depicted using one or more error bars.

4. The method of claim 1, wherein the depicting step includes depicting an anomaly flag on a time scale, wherein the position of the anomaly flag on the time scale is set based on the future time.

5. The method of claim 4, wherein the time scale autoscales as the future time approaches.

6. The method of claim 4, wherein the depicting step includes animation to move the anomaly flag relative to the time scale as the future time approaches.

7. The method of claim 1, comprising:
determining, via the at least one processor, at the future time that the at least one avionics data source is considered to be in the anomalous condition when the major anomaly threshold has been crossed;
depicting, on the display device, a failure flag depicting an anomalous status flag for the at least one avionics data source at the future time;
predicting, via the at least one processor, a second time following the future time when a functioning threshold will be crossed based on the time series data received at the second time, the second time representing when the at least one avionics data source will be deemed no longer anomalous and functioning; and
depicting, on the display device associated with the aircraft, the second time when the functioning threshold will be crossed.

8. The method of claim 1, wherein depicting the future time includes moving an anomaly flag along a time graph as the future time approaches and moving the anomaly flag into a static gutter portion adjacent the time graph when the at least one avionics data source is determined to be in the anomalous condition.

9. The method of claim 1, wherein determining the current anomaly metric data comprises:
determining the current anomaly metric data representing data jump;
determining the current anomaly metric data representing frozen data source;
determining the current anomaly metric data representing gradual data drift; or
determining the current anomaly metric data representing data variance.

10. The method of claim 1, wherein the predicting the future time is performed by linear extrapolation, polynomial extrapolation, or autoregressive methods.

11. The method of claim 1, wherein the at least one avionics data source comprises:
distance measuring data source;
flight path vector source;
aircraft speed data source;
aircraft altitude data source;
instrument landing system data source;
aircraft heading data source;
aircraft attitude data source;
glideslope data source;
flight director data source; or
vertical speed data source.

12. The method of claim 1, comprising displaying one or more display elements based on the time series data and removing the one or more display elements when the at least one avionics data source is determined to be in the anomalous condition.

13. A system for depicting avionics data anomalies in an aircraft, the system comprising:
a display device associated with the aircraft;
an avionics data source; and
a processor in operable communication with the display device and the avionics data source, the processor configured to execute program instructions, wherein the program instructions are configured to cause the processor to:
receive current time series data from the avionics data source;
determine current anomaly metric data based on the current time series data;
upon a determination that the current anomaly metric data crosses a minor anomaly threshold;
predict a future time when major anomaly threshold will be crossed by future anomaly metric data associated with future time series data received at the future time based on an extrapolation of the current time series data; and
depict, via the display device associated with the aircraft, an indication that the avionics data source will be considered to be in an anomalous condition at the future time when the major anomaly threshold will be crossed.

14. The system of claim 13, wherein the program instructions are configured to cause the processor to provide a time uncertainty associated with the future time when the major anomaly threshold will be crossed and to depict the future time when the major anomaly threshold will be crossed and the time uncertainty.

15. The system of claim 14, wherein the time uncertainty is depicted using one or more error bars.

16. The system of claim 13, wherein the program instructions are configured to cause the processor to depict an anomaly flag on a time scale, wherein the position of the anomaly flag on the time scale is set based on the future time.

17. The method of claim 16, wherein the program instructions are configured to cause the processor to include animation to move the failure flag relative to the time scale as the future time approaches.

* * * * *